United States Patent [19]

Lachmann et al.

[11] 4,228,067
[45] Oct. 14, 1980

[54] UV LIGHT STABILIZED POLYCARBONATE COMPOSITION

[75] Inventors: Burkhard Lachmann, Krefeld; Hans Rudolph, Krefeld-Bockum; Wolfgang Cohnen, Krefeld, all of Fed. Rep. of Germany

[73] Assignee: Bayer Aktiengesellschaft, Fed. Rep. of Germany

[21] Appl. No.: 2,882

[22] Filed: Jan. 12, 1979

Related U.S. Application Data

[63] Continuation of Ser. No. 934,311, Sep. 19, 1977, abandoned, which is a continuation of Ser. No. 455,170, Feb. 25, 1974, abandoned.

[30] Foreign Application Priority Data

Mar. 1, 1973 [DE] Fed. Rep. of Germany ....... 2310135

[51] Int. Cl.$^2$ ............................................. C08K 5/12
[52] U.S. Cl. ............................................. 260/45.85 V
[58] Field of Search ................................. 260/45.85 V

[56] References Cited

U.S. PATENT DOCUMENTS

| 3,278,448 | 10/1966 | Laurer et al. | 260/45.85 V |
| 3,337,357 | 8/1967 | Strobel et al. | 260/45.85 A |
| 3,644,466 | 2/1972 | Strobel et al. | 260/45.85 A |

*Primary Examiner*—V. P. Hoke
*Attorney, Agent, or Firm*—Connolly and Hutz

[57] ABSTRACT

Object of the invention are UV absorbents for numerous polymers which are distinguished by their comparative lack of self-color, high light absorption and good compatibility with the polymers as well as with other additives.

4 Claims, No Drawings

UV LIGHT STABILIZED POLYCARBONATE COMPOSITION

CROSS-REFERENCE TO RELATED APPLICATIONS

This application is a continuation of application Ser. No. 934,311 filed Sept. 19, 1977 and now abandoned which in turn is a continuation of application Ser. No. 445,170 filed Feb. 25, 1974 and now abandoned.

Plastics are degraded by the action of UV rays, for example in sun-light. This degradation causes yellowing of the polymers and has deleterious effect on mechanical properties such as notched impact strength, tensile strength and flexural strength. To protect the polymers against this degradation by light, they may be stabilised with UV absorbents.

Numerous light stabilisers are already known but they have various disadvantages. An ideal UV absorbent, which is not volatile, which has a wide absorption range but is itself colourless and which stabilises all polymers equally well without affecting their mechanical properties, has not yet been developed. Most of the existing stabilisers are particularly suitable for some polymers, but less effective for others.

Owing to the continuous improvement in the properties of polymers, there is also a constant increase in the required standard of the light stabilisers incorporated in them. Thus, for example, certain UV absorbents of the benzotriazole series, which have previously been used in transparent polycarbonate, no longer satisfy present-day requirements because of their own natural colour so that the polycarbonate stabilized with them can no longer achieve the required colour index value.

High-quality plastics, moreover, frequently also contain other additives, such as antioxidants and heat stabilisers. These may be incompatible with certain UV absorbents, a fact which may not be foreseeable and which may cause unwanted discolouration of extruded material.

Thus, for example, certain UV absorbents of the benzotriazole series as well as some from the benzal malonic ester series are incompatible with heat stabilisers of the phosphite series used in the polycarbonate, with the result that the material is discoloured.

An object of this invention, therefore, is to develop UV absorbents which will not have the disadvantages mentioned above.

It has now been found that the UV absorbents according to the invention are excellent light stabilisers for numerous polymers. They are distinguished by their comparative lack of self colour, high light absorption and good compatibility with the substrate as well as with other additives.

This invention thus provides a process for stabilising polymers which is characterised in that a compound of the general formula (1)

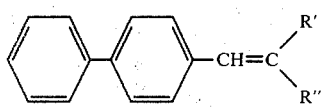

in which R'=CN, COX or COOR and R"=COX or COOR, wherein X denotes the group

and R denotes hydrogen, straight chain or branched chain alkyl groups containing 1–12 C-atoms or cyclohexyl is added to the polymers, optionally in combination with known UV absorbents.

The invention also relates to UV stabilisers of the general formula (1) and to polymers which have been stabilised by the process according to the invention.

The following are examples of compounds of the general formula (1):

TABLE 1 diethyl ester of 4-phenyl-benzylidene-malonic acid;
dimethyl ester of 4-phenyl-benzylidene-malonic acid;
di-n-octyl ester of 4-phenyl-benzylidene-malonic acid;
di-(2-ethylhexyl) ester of 4-phenyl-benzylidene-malonic acid;
di-n-dodecyl ester of 4-phenyl-benzylidene-malonic acid;
methyl ester of 4-phenyl-benzylidene-cyanoacetic acid;
ethyl ester of 4-phenyl-benzylidene-cyanoacetic acid;
n-octyl ester of 4-phenyl-benzylidene-cyanoacetic acid;
2-ethylhexyl ester of 4-phenyl-benzylidene-cyanoacetic acid;
4-phenyl-benzylidene-cyanoacetic acid;
4-phenyl-benzylidene-malonic acid;
n-hexyl ester of 4-phenyl-benzylidene-cyanoacetic acid;
n-decyl ester of 4-phenyl-benzylidene-cyanoacetic acid;
4-phenyl-benzylidene-cyanoacetic acid N-cyclohexylamide;
4-phenyl-benzylidene-cyanoacetic acid N-dodecylamide;
4-phenyl-benzylidene-malonic acid N,N'-di-cyclohexylamide.

Preferred compounds are those which can be represented by the following formulae (2) and (3):

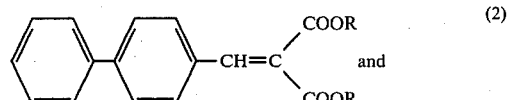

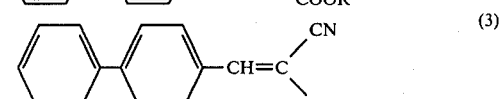

in which R has the meaning already indicated. The following are given as specific examples:
diethyl ester of 4-phenyl-benzylidene-malonic acid;
dimethyl ester of 4-phenyl-benzylidene-malonic acid;
di-n-octyl ester of 4-phenyl-benzylidene-malonic acid;
di-(2-ethylhexyl) ester of 4-phenyl-benzylidene-malonic acid;
di-n-dodecyl ester of 4-phenyl-benzylidene-malonic acid;
methyl ester of 4-phenyl-benzylidene-cyanoacetic acid;
ethyl ester of 4-phenyl-benzylidene-cyanoacetic acid;
n-octyl ester of 4-phenyl-benzylidene-cyanoacetic acid;
2-ethylhexyl ester of 4-phenyl-benzylidene-cyanoacetic acid;
4-phenyl-benzylidene-cyanoacetic acid;
4-phenyl-benzylidene-malonic acid;

n-hexyl ester of 4-phenyl-benzylidene-cyanoacetic acid;
n-decyl ester of 4-phenyl-benzylidene-cyanoacetic acid;

The following are particularly preferred:
diethyl ester of 4-phenyl-benzylidene-malonic acid;
dimethyl ester of 4-phenyl-benzylidene-malonic acid;
di-n-octyl ester of 4-phenyl-benzylidene-malonic acid;
di-(2-ethylhexyl) ester of 4-phenyl-benzylidene-malonic acid;
di-n-dodecyl ester of 4-phenyl-benzylidene-malonic acid;
methyl ester of 4-phenyl-benzylidene-cyanoacetic acid;
ethyl ester of 4-phenyl-benzylidene-cyanoacetic acid;
n-octyl ester of 4-phenyl-benzylidene-cyanoacetic ester;
2-ethylhexyl ester of 4-phenyl-benzylidene-cyanoacetic acid;
n-hexyl ester of 4-phenyl-benzylidene-cyanoacetic acid;
n-decyl ester of 4-phenyl-benzylidene-cyanoacetic acid.

The compounds are suitable light stabilisers for polymers such as inter alia polystyrene, polyacrylonitriles, polymethacrylates and their copolymers; polymers of the acrylonitrile/butadiene/styrene series; polyolefines such as polybutadiene, polyvinyl chloride, polyvinylidene chloride, polypropylene, polyethylene and its copolymers; polycarbonates based on aromatic dihydroxy compounds; polyethers; unsaturated polyesters based on α,β-ethylenically unsaturated dicarboxylic acids and polyols, particularly glycols, for example polyesters of maleic acid anhydride and propylene glycol; saturated polyesters based on adipic acid, terephthalic acid, ethylene glycol, hexane-1,6-diol or propane-1,2-diol; polyamides based on ε-caprolactam or condensates of hexamethylene diamine and adipic acid as well as polyurethanes obtained from diisocyanates such as tolylene diisocyanate or hexamethylene diisocyanate and diols such as ethylene glycol or hexamethylene glycol.

Compounds of the general formula (1) may be obtained in a known manner (e.g. according to "Organic Synthesis" Coll. Vol. III, p. 377 (1955)) by the condensation of diphenyl aldehyde with derivatives of the general formula (4):

in which R' and R" have the meanings already indicated above, in a suitable solvent such as chloroform, benzene or toluene, accompanied by azeotropic distillation of the water of reaction. They may also be obtained by the condensation of diphenyl aldehyde with derivatives of the general formula (4) in a low-molecular weight aliphatic alcohol such as ethanol or isopropanol, in which case catalytic quantities of a secondary or primary amine such as piperidine or cyclohexylamine and a small quantity of an organic acid, such as acetic acid, are advantageously added.

In addition to containing compounds of the general formulae (1), (2) and (3), the polymers which are to be stabilised may contain other additives such as antioxidants, heat stabilisers, flame-retarding agents or antistatic agents. Each of the additives as well as compounds of the general formulae 1, 2 and 3 may be added in quantities of from 0.01 to 5% by weight, based on the polymer.

The UV absorbents according to the invention may also be added to the polymer in combination with other well known UV absorbents, for example compounds of the following general formulae R and R' having the meanings indicated:

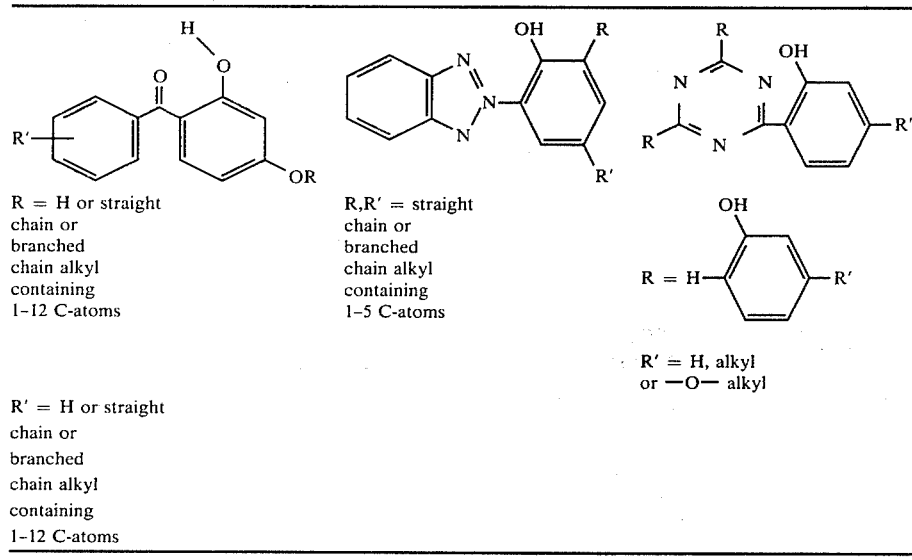

The compounds are preferably incorporated in quantities of from 0.01 to 5% by weight, particularly 0.1–2% by weight, based on the polymer.

Incorporation of the compounds may be carried out by known methods, for example by 1. adding solvent-free UV absorbent to the polymer melt;
2. applying the UV absorbent in powder form to the solid polymer (granulate) by spraying or rolling, followed by extrusion at the melting temperature;
3. adding the UV absorbent to a suspension or solution of the polymer while it is being processed; or
4. preparing polymer combinations which contain a high proportion of UV absorbents (master batch) and then mixing these concentrates with polymer which has not been stabilised.

Methylene-malonic acid derivatives have already been proposed as UV absorbents but compounds of the general formula (1) are distinguished from the compounds described in German Patent Specification No. 1 087 902 and in German Offenlegungsschriften Nos. 1 801 221 and 1 544 605 by their improved properties.

The compounds used according to the invention have a better stabilising effect. In high-quality polymers, e.g. aromatic polycarbonates, the compounds according to the invention, and especially those of the general formula (2), have excellent compatibility with heat stabilisers of the phosphite series such as di-n-decyl-phenyl-phosphite. On the other hand, typical representatives of compounds of the benzotriazole series known in the art as well as some methylene malonic acid derivatives, are incompatible with these heat stabilisers and therefore give rise to discolourations which become very marked at the high melting temperatures of the polymers, e.g. the polycarbonate, which must be employed for incorporating these additives.

Furthermore, the compounds used according to the invention, and especially those of the general formula (3), combine a very long-wave absorption maximum and high molar extinction coefficient with the advantage of having very little self colour. These excellent qualities are obviously due to the presence of the 4-phenyl substitutents.

The matter of the invention will be described in more detail in the following examples, without being restricted by them.

EXAMPLE 1

Dimethyl ester of 4-phenyl-benzylidene-malonic acid: 275 g (1.5 mol) of 4-phenyl-benzaldehyde and 195 g (1.5 mol) of dimethyl malonate are reacted for 10 hours in a stirrer apparatus with water separator, 6 g of piperidine, 20 g of glacial acetic acid and 1 l of benzene being added. At the end of this time, the necessary quantity of water has separated. After extraction with water, the solvent is distilled off and the residue is left to crystallise. After recrystallisation from methanol, 360 g (82% of the theoretical quantity of almost colourless crystals are obtained. Mp: 78°–80° C.

Analysis: $C_{18}H_{16}O_4$: calculated; C; 72.96 H; 5.44; found: 72.8 5.35

EXAMPLE 2

(a) Diethyl ester of 4-phenyl-benzylidene-malonic acid:

55 g (0.3 mol) of 4-phenyl-benzaldehyde, 50 g (0.3 mol) of diethyl malonate, 4 g of glacial acetic acid, 2.5 g of cyclohexylamine and 110 cc of ethanol are added together and heated under reflux for 8 hours. Crystals are isolated by suction filtration after the reaction solution has cooled and are recrystallised from three times their quantity of 95% aqueous ethanol. Yield 73 g (75% of theoretical quantity) of colourless crystals, Mp: 56°–58° C.

Analysis: $C_{20}H_{20}O_4$: calculated: C; 74.05 H; 6.22; found: 74.2 6.25

(b) 487 g (2.68 mol) of 4-phenyl-benzaldehyde and 438 g (2.74 mol) of diethyl malonate are reacted for 10 hours in a stirrer apparatus with water separator, 10 g of piperidine, 20 g of glacial acetic acid and 1600 cc of benzene being added. The appropriate quantity of water has separated by the end of this time. After extraction with water, the solvent is evaporated off and the residue is distilled under vacuum (Bp: 190°–192° C./0.2 mm Hg) and then recrystallised from a small quantity of 95% aqueous ethanol. Yield: 700 g ( 81% of the theoretical quantity), of colourless crystals, Mp: 54°–56° C.

Analysis: $C_{20}H_{20}O_4$: calculated: C; 74.05 H; 6.22; found: 74.2 6.25

EXAMPLE 3 n-octly ester of 4-phenyl-benzylidene-cyanoacetic acid: 55 g (0.3 mol) of 4-phenyl-benzaldehyde and 60 g (0.3 mol) of the n-octyl ester of cyanoacetic acid are reacted for 3 hours in a stirrer apparatus with water separator, 1 g of piperidine, 3.5 g of glacial acetic acid and 200 cc of benzene being added. The appropriate quantity of water has separated by the end of this time. After extraction with water followed by evaporation of the solvent, the residue crystallises. It is then recrystallised from 400 cc of ethanol. Yield: 92 g (85% of the theoretical quantity) of pale yellow crystals, Mp: 58°–61° C.

Analysis: $C_{24}H_{27}N_1O_2$: calculated: C; 79.74 H; 7.53 N; 3.88 found: 79.8 7.3 3.93

The corresponding derivatives can be prepared by reacting 4-phenyl-benzaldehyde in analogous manner with other malonic acid ester or cyanoacetic acid ester derivatives by the methods described in examples 1–3.

EXAMPLE 4

Stabilisation of polycarbonate:

Polycarbonate based on bisphenol A and having a relative viscosity of $\eta_{rel}=1.274$ is mixed with 0.5% by weight of one of the compounds shown in table 2 at about 280° C. and homogenised. The homogeneous mixture is then worked up into test rods 4 mm in thickness at 330° C. These test rods are used to measure the percentage light transmission values at 420 nm immediately after incorporation of the compound (blank sample), after tempering and after weathering in a weatherometer. The results obtained are summarised in table 3.

TABLE 2

| Compound | Melting point (°C.) | λmax (nm) | ε (1 mole . cm$^2$) | |
|---|---|---|---|---|
| diethyl ester of 4-phenyl-benzylidene-malonic acid | 54–56 | 311 | 32 | 500 |

| Compound | Melting point (°C.) | max (nm) | (1 mole . cm$^2$) | |
|---|---|---|---|---|
| dimethyl ester of 4-phenyl-benzylidene-malonic acid | 79 | 312 | 27 | 000 |
| di-n-octyl ester of 4-phenyl-benzylidene-malonic acid | 20–22 | 312 | 26 | 500 |

TABLE 3

Light transmission values of polycarbonates containing samples 1-6

| Sample No. | Absorbent | Light transmission[1] at zero time (420 nm) (%) | Light transmission[2] after tempering (420 nm) (%) | Light transmission[3] after weathering (420 nm) (%) |
|---|---|---|---|---|
| 1. | Zero sample without additive | 78.5 | 74 | 58 |
| 2. | Diethyl ester of p-methoxy-benzylidene-malonic acid | 78 | 67 ← | 65.5 ← |
| 3. | 2-(2'-hydroxy-3',5'-diisopentylphenyl)-benzotriazole | 74 | 47.5 | 62 |
| 4. | Diethyl ester of 4-phenyl-benzylidene-malonic acid | 78.5 | 67 ← | 67.5 ← |
| 5. | Dimethyl ester of 4-phenyl-benzylidene-malonic acid | 78 | 68.5 | 67 |
| 6. | Di-n-octyl ester of 4-phenyl-benzylidene-malonic acid | 78.5 | 68 | 67 |

[1] determined according DIN 5033
[2] at 140° C. in air for 63 days
[3] for 1500 hours As can be seen from table 3, samples 4, 5 and 6 have the highest values for light transmission at a wavelength of 420 nm after weathering, i.e. yellowing is least in these samples.

The diethyl ester of 4-phenyl-benzylidene-malonic acid, dimethyl ester of 4-phenyl-benzylidene-malonic acid and di-n-octyl ester of 4-phenyl-benzylidene-malonic acid have a better stabilising effect in the polycarbonate than the diethyl ester of p-methoxy-benzylidene-malonic acid and 2-(2'-hydroxy-3',5'-diisopentylphenyl)-benzotriazole, which are two compounds of the known art.

EXAMPLE 5

In comparison experiment, a polycarbonate based on bisphenol A having a relative viscosity of $\eta_{rel}=1.281$ was vigorously mixed at 280° C.

(a) with 0.5% by weight of the diethyl ester of 4-phenyl-benzylidene-malonic acid and 0.1% by weight of a heat stabiliser based on di-n-decylphenyl phosphite, and (b) with 0.5% by weight of the prior art UV absorbent 2-(2'-hydroxy-3',5'-diisopentylphenyl)-benzotriazole and 0.1% by weight of a heat stabiliser based on di-n-decylphenyl phosphite and the polycarbonate was then extruded at 320° C. in each case.

While the polycarbonate which had been stabilised according to (b) was found to be discoloured owing to incompatibility between the UV absorbent of the prior art and the heat stabiliser, the polycarbonate which had been stabilised according to (a) with the UV absorbent according to the invention and heat stabiliser remained colourless.

These differences in compatibility are also clear from the light transmission values obtained:

| Test sample stabilised according to | Light transmission of test sample (420 nm) (%) |
|---|---|
| a | 78.0 |
| b | 73.5 |

EXAMPLE 6

Stabilisation of a polyamide 0.5% by weight of 4-phenyl-benzylidene-malonic acid diethyl ester, 4-phenyl-benzylidene-cyanoacetic acid N-cyclohexylamide or 4-phenyl-benzylidene-malonic acid N,N'-di-cyclohexylamide (see table 1) were worked into a polyamide based on caprolactam at 250° C. for a short time and the polyamide was then blown to form a sheeting of 25μ thickness.

The sheetings obtained in this way are colourless and absorb 80–90% of incident UV light in the range of 280–330 nm. For comparison, a sheeting was blown under the same conditions from a polyamide which contained 0.5% by weight of the commercial UV absorbent 2-(2'-hydroxy-5'-methylphenyl)-benzotriazole. This light stabiliser caused yellowing of the sheeting under the operating conditions employed.

EXAMPLE 7

Stabilisation of an unsaturated polyester

An unsaturated polyester composed of 83.5 parts of propylene glycol units, 44.5 parts of phthalic acid anhydride units and 8.5 parts of maleic acid anhydride units in the form of a 65% solution in styrene was used to cast sheets of 2 mm in thickness which contained 0.25% by weight of one of the UV absorbents shown in the following table 4. These sheets were exposed to weathering in a xenon weatherometer (102:18; pyrex filter) for 1000 hours.

The degree of yellowing was determined by measuring the spectral colour density Pc of the samples before and after weathering.

It can be seen from table 4 that samples 3, 4 and 5, which serve as examples of the compounds used according to the invention, undergo distinctly less yellowing in the weathering test than the comparison sample 2 which contains a conventional UV absorbent.

TABLE 4

| Sample No. | UV absorbent 0.25% by weight | $Pc^+$ before weathering | after 1000 hours in the weatherometer |
|---|---|---|---|
| 1 | without additive | 0.0166 | 0.130 |
| 2 | 2-hydroxy-4-methoxy- | 0.0160 | 0.034 |

TABLE 4-continued

| Sample No. | UV absorbent 0.25% by weight | Pc+ before weathering | after 1000 hours in the weatherometer |
|---|---|---|---|
| 3 | benzophenone diethyl ester of 4-phenyl- | 0.0053 | 0.018 |
| 4 | benzylidene-malonic acid methyl ester of 4-phenyl-benzylidene-cyanoacetic acid | 0.0086 | 0.028 |
| 5 | isooctyl ester of 4-phenyl-benzylidene-cyanoacetic acid. | 0.0073 | 0.024 |

+ The spectral colour density Pc is a colour measure according to the system of Helmholtz measures and indicates the intensity of colour.

EXAMPLE 8

Stabilisation of a soft polyvinyl chloride:

70 parts of a PVC suspension with a K-value of 70 were vigorously mixed with 30 parts of the plasticiser dioctyl phthalate, 1.5 parts of a Ba-Cd heat stabiliser (Irgastab BC 26) and 0.175 parts of one of the UV absorbents shown in the following table 5, and were then rolled out for 10 minutes at 170° C. to form a film of 200μ in thickness.

The samples (5×100 mm) were exposed to weathering in a xenon weatherometer (pyrex filter, 102:18) for 1000 hours. The spectral colour density Pc of the samples was measured to determine the degree of yellowing. Tensile tests were carried out to determine any alteration in the mechanical properties. The results are shown in table 5 and are self explanatory.

Sample No. 2 contains a commercial UV absorbent while samples Nos 3 and 4 contain UV absorbents used according to the invention.

TABLE 5

| Sample No. | UV absorbent | Pc[1] after weathering in the WOM | | Tensile test after weathering in the WOM | | | |
|---|---|---|---|---|---|---|---|
| | | | | 0 hours | | 1000 hours | |
| | | 0 hours | 1000 hours | $\sigma_R^2$ (kg/cm$^2$) | $\epsilon_R^3$ (%) | $\sigma_R$ (kp/cm$^2$) | $\epsilon_R$ (%) |
| 1 | Without additive | 0.0114 | 0.031 | 248 | 290 | 163 | 82 |
| 2 | 2-hydroxy-4-methoxy-benzophenone | 0.0112 | 0.028 | 242 | 298 | 195 | 153 |
| 3 | Di-n-octyl ester of 4-phenyl-benzylidene-malonic acid | 0.0110 | 0.023 | 249 | 314 | 229 | 231 |
| 4 | Di-n-diodecyl ester of 4-phenyl-benzylidene-malonic acid | 0.0111 | 0.024 | 247 | 305 | 222 | 212 |

[1]The spectral colour density Pc is a colour measure according to the system of Holmholtz measures and indicates the intensity of colour.
[2]Tensile strength.
[3]Elongation on tearing

We claim:

1. A composition comprising an aromatic mixture of a polycarbonate subject to degradation by UV light and a light stabilizing amount of a UV absorbent compound of the formula

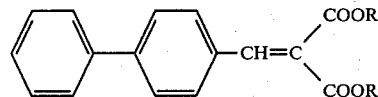

wherein R is hydrogen, alkyl having 1 to 12 carbon atoms or cyclohexyl.

2. The composition of claim 1 in admixture with a light stabilizing amount of another UV absorbent.

3. The composition of claim 1 wherein said light stabilizing amount of said compound of said formula is from 0.01 to 5% by weight, based on said polycarbonate.

4. The composition of claim 3 wherein said amount is from 0.1 to 2% by weight, based on said polycarbonate.

* * * * *